R. McELDOWNEY.
DUMP TRUCK.
APPLICATION FILED JULY 24, 1920.
1,428,293.
Patented Sept. 5, 1922.
2 SHEETS—SHEET 1.
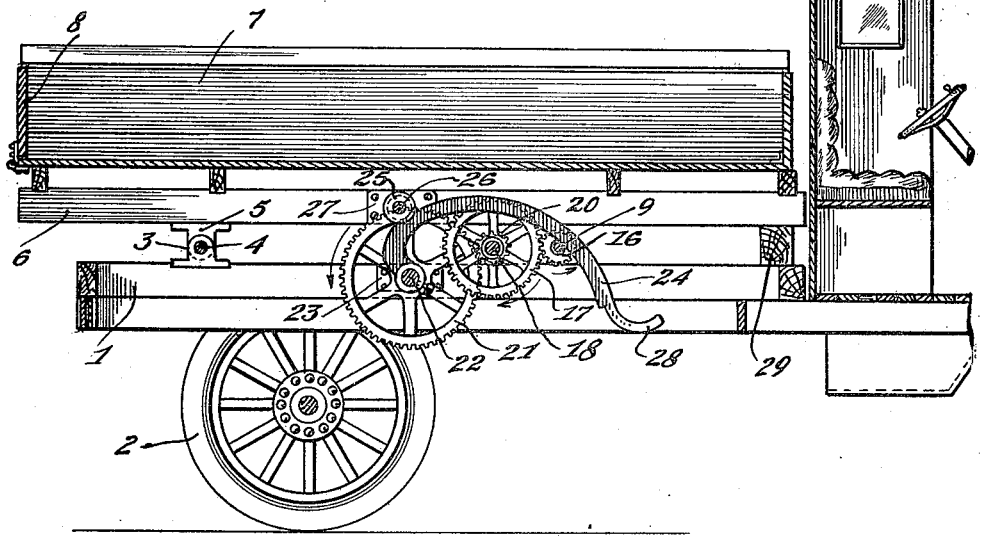
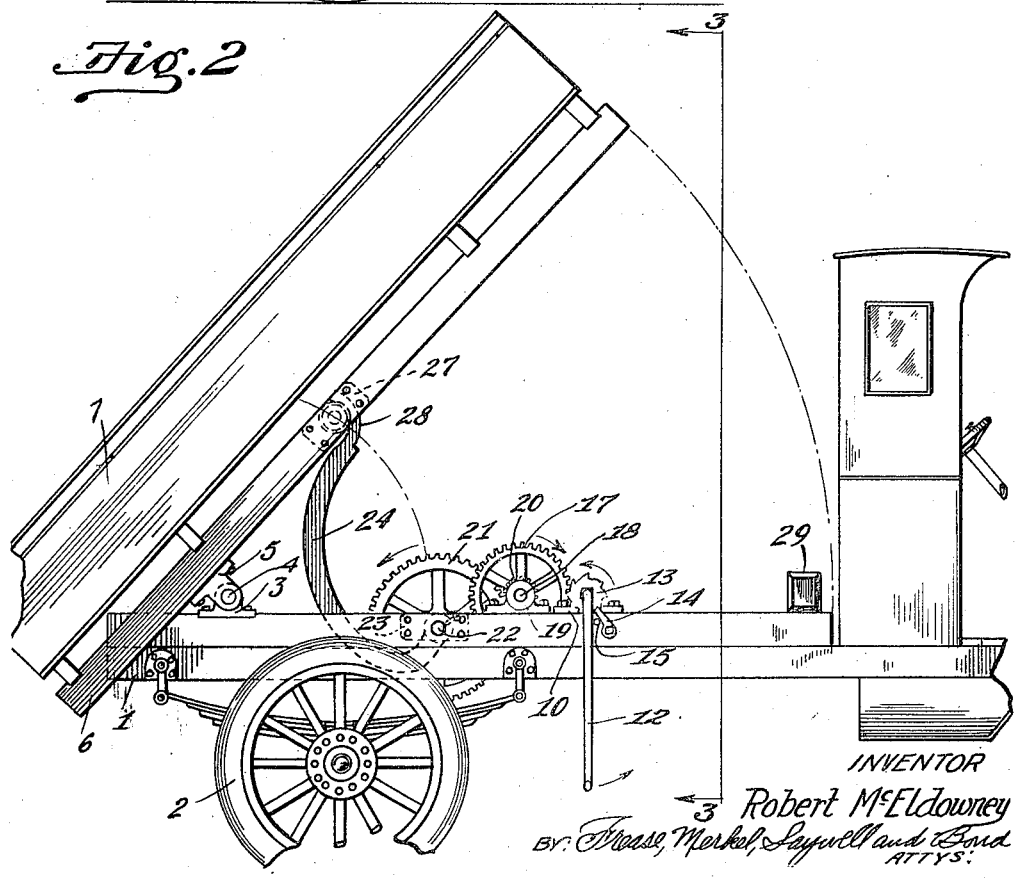
INVENTOR
Robert McEldowney
BY Froase, Merkel, Saywell and Bond
ATTYS.

R. McELDOWNEY.
DUMP TRUCK.
APPLICATION FILED JULY 24, 1920.
1,428,293.
Patented Sept. 5, 1922.
2 SHEETS—SHEET 2.
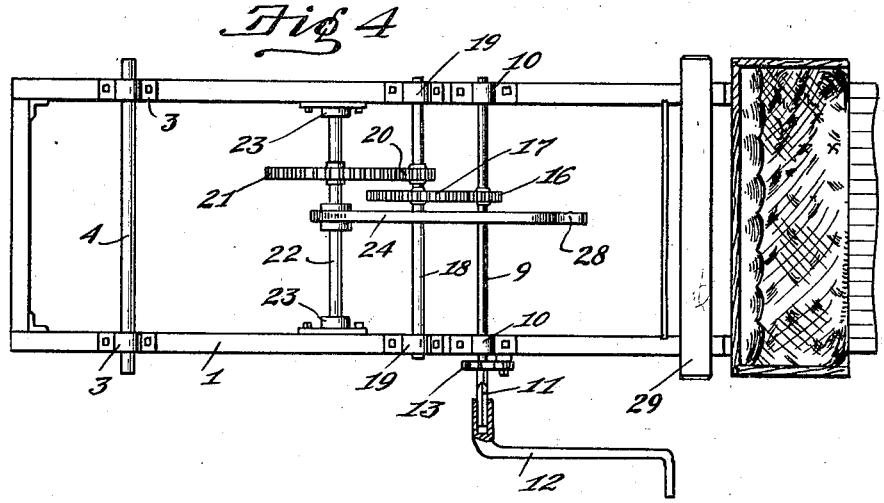
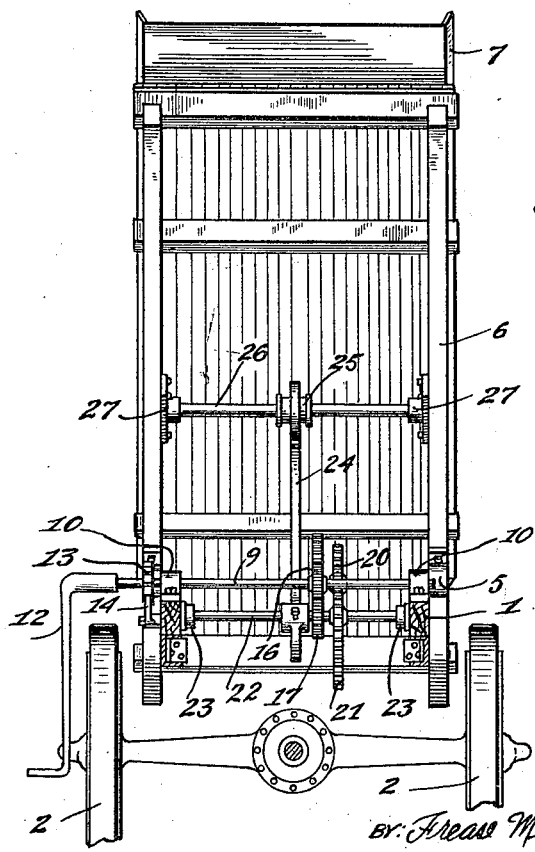
INVENTOR
Robert McEldowney Patented Sept. 5, 1922.

1,428,293

UNITED STATES PATENT OFFICE.

ROBERT McELDOWNEY, OF CANTON, OHIO, ASSIGNOR TO MICHAEL H. McKENNA, OF CLEVELAND, OHIO.

DUMP TRUCK.

Application filed July 24, 1920. Serial No. 398,690.

*To all whom it may concern:*

Be it known that I, ROBERT MCELDOWNEY, a citizen of the United States, residing at Canton, in the county of Stark and State of Ohio, have invented a new and useful Dump Truck, of which the following is a specification.

This invention relates to dump trucks and has for its object the provision of a dump truck upon which the body or box is pivotally mounted and arranged to be tilted by means of a cam arm connected through a chain of gears with an operating handle or frame by means of which the box when loaded to capacity may be easily and readily tilted into position to dump the load therefrom.

With these objects in view the invention consists in the novel construction and arrangement of parts, hereinafter described, illustrated in the accompanying drawings, and particularly pointed out in the appended claim, it being understood that various changes in the form, proportions, size and minor details of construction may be made within the scope of the appended claim without departing from the spirit or sacrificing any of the advantages of the invention.

The invention thus set forth in general terms is illustrated in the accompanying drawings forming part hereof, in which—

Figure 1 is a longitudinal sectional view through a truck embodying the invention showing the box in the normal or lowered position.

Fig. 2 is a side elevation of the truck showing the box in the dumped or tilted box.

Fig. 3 is a section on the line 3—3, Fig. 2.

Fig. 4 is a plan view of the frame of the truck with the box removed.

A practical embodiment of the invention is disclosed in the accompanying drawings, forming a part of this specification in which similar numerals of reference indicate corresponding parts throughout the several views.

The truck comprises the rectangular frame 1, supported in the usual manner upon the wheels 2, bearings 3 being provided near the rear end of said frame and supporting a shaft 4, said shaft being also journaled through the bearings 5 carried upon the under side of the base 6 upon which the box or body 7 of the truck is fixed. The usual endgate 8 is provided at the rear end of the box or body.

A shaft 9 is journaled in bearings 10 mounted upon the rectangular frame 1, said shaft being provided with the squared end 11 arranged to receive the crank 12 by means of which the shaft may be rotated. A ratchet 13 is fixed upon the shaft 9 and a pivoted pawl 14 co-operates therewith to hold the shaft 9 in any desired position, a pin 15 being provided in the frame 1 to limit the downward movement of the pawl and prevent the same from dropping out of engagement with the ratchet.

A pinion 16 is fixed upon the shaft 9 and meshes with a gear 17 fixed upon the shaft 18, which shaft is journaled in bearings 19 mounted upon the rectangular frame 1. A pinion 20 is also fixed upon the shaft 19 and meshes with the gear 21 which is fixed upon the shaft 22, said shaft being journaled in the bearings 23 also mounted upon the frame 1. A cam 24 is fixed upon the shaft 22 and engages a roller 25 mounted upon the shaft 26, said shaft being supported in the bearings 27 mounted upon the base 6 of the box or body of the truck, a roller bearing preferably being provided between the shaft 26 and the roller 25. The outer free end of the cam arm 24 is curved upwardly forming a hook 28 which acts as a stop, being arranged to engage the roller 25 when the box or body 7 has been raised to its uppermost position.

The box or body 7 is normally in the lowered position as best illustrated in Fig. 1. The forward end of the base 6 thereof resting upon the cross piece 29 which is mounted upon the rectangular frame 1, the roller 25 engaging the rear portion of the cam arm 24 at a point near the rock shaft 22 upon which said cam arm is mounted.

When it is desired to tilt the box or body of the truck to dump the contents thereof, the crank 12 is turned in the direction of the arrow shown in Fig. 2 and through the chain of gearing above described, the rock shaft 22 is rotated toward the rear of the truck rocking the cam arm 24 upwardly and rearwardly, the roller 25 riding upwardly upon said arm and tilting the forward end of the box or body upwardly, said box pivoting upon the shaft 4. As the arm 24 reaches the upper limit of its movement the hook 28 thereon engages the roller 25 preventing the roller from slipping over the end of said arm, the pawl 14 holding the ratchet 13 against movement in the reverse direction.

When it is desired to lower the box or body back to the normal position the pawl 14 is disengaged from the ratchet 13 and the crank 12 rotated in the opposite direction slowly lowering the box or body of the truck to the normal position.

It will be evident from the above description and an inspection of the drawings that a dump truck is thus produced in which the body or box may be easily and quickly tilted or lowered by means of a hand crank which is operatively connected through a chain of gears with a cam arm.

I claim:

In a truck, the combination of a frame, a body pivotally mounted near its rear end upon the frame, a roller upon the under side of the body forward of the pivotal point of the body, a rock shaft in the frame beneath and forward of the roller, a cam arm having a forwardly disposed arcuate portion for engagement with the roller and an inwardly disposed portion connected to the rock shaft, and means for rocking said rock shaft to tilt the body upon its pivot.

In testimony that I claim the above, I have hereunto subscribed my name.

ROBERT McELDOWNEY.